United States Patent [19]
Crum et al.

[11] Patent Number: 6,132,511
[45] Date of Patent: *Oct. 17, 2000

[54] DISTRIBUTED CONTROL SYSTEM FOR POWDER COATING SYSTEM

[75] Inventors: Gerald W. Crum, Elyria, Ohio; Eddie W. Dixson, Jr., Norcross, Ga.; Charles L. Gatian, III, North Ridgeville, Ohio; Jeanne Marie Leidy, Rocky River, Ohio; William Mark Rucki, Aurora, Ohio; Joseph G. Schroeder, North Royalton, Ohio; Cynthia Skelton-Becker, Rocky River, Ohio

[73] Assignee: Nordson Corporation, Westlake, Ohio

[*] Notice: This patent is subject to a terminal disclaimer.

[21] Appl. No.: 09/401,703

[22] Filed: Sep. 23, 1999

Related U.S. Application Data

[63] Continuation of application No. 09/198,358, Nov. 24, 1998, Pat. No. 6,017,394, which is a continuation of application No. 08/896,696, Jul. 18, 1997, Pat. No. 5,843,515, which is a division of application No. 08/320,882, Oct. 5, 1994, Pat. No. 5,718,767.

[51] Int. Cl.$^7$ ............................... B05C 11/10; B67D 5/08

[52] U.S. Cl. ............................. 118/706; 118/308; 222/52; 239/67

[58] Field of Search ............................ 118/696, 706, 118/697, 308, 313, 314, 315, 316; 239/61, 67, 68, 69; 222/52, 59, 14

[56] References Cited

U.S. PATENT DOCUMENTS

| | | |
|---|---|---|
| 3,450,092 | 6/1969 | Koch . |
| 3,866,571 | 2/1975 | Austin et al. . |
| 3,989,003 | 11/1976 | Fagan et al. . |
| 4,357,900 | 11/1982 | Buschor . |
| 4,614,300 | 9/1986 | Falcoff . |
| 4,918,690 | 4/1990 | Markkula, Jr. et al. . |
| 4,925,354 | 5/1990 | Cote . |
| 5,056,462 | 10/1991 | Perkins et al. . |
| 5,167,714 | 12/1992 | Gimben et al. . |
| 5,208,064 | 5/1993 | Becker et al. . |
| 5,443,642 | 8/1995 | Bienduga . |
| 5,447,574 | 9/1995 | Inoue . |
| 5,524,794 | 6/1996 | Benedetti, Jr. et al. . |
| 5,718,767 | 2/1998 | Crum et al. . |
| 5,843,515 | 12/1998 | Crum et al. . |

FOREIGN PATENT DOCUMENTS

| | | |
|---|---|---|
| 0160167 | 11/1985 | European Pat. Off. . |
| 0207168 | 1/1987 | European Pat. Off. . |
| 2118740 | 11/1983 | United Kingdom . |

OTHER PUBLICATIONS

Nordson Corporation, *Powder Coating Systems*, Publication No. 306–18–994, Issued Sep. 1991.

Nordson Corporation, *100 Plus Electrostatic Power Unit*, Manual No. 33–6, pp. 2–1 through 2–5 and 8–2.

Nordson Corporation, *Smart–Spray Master Control Unit*, Manual No. 33–11, pp. 2–1 and 2–16.

*Primary Examiner*—Richard Crispino
*Assistant Examiner*—George R. Koch, III
*Attorney, Agent, or Firm*—Wood, Herron & Evans, L.L.P.

[57] ABSTRACT

A powder coating control system comprising a plurality of gun controls associated with a like plurality of powder spray guns. Each of the gun controls stores a plurality of presets spray parameters. Each of the gun controls responds to part identification signals and part position signals to select in real time one of the stored presets of spray parameters and trigger its respective powder spray gun ON and OFF to apply a powder coating to the moving part in accordance with the selected set of spray parameters. The control system further permits a gun purge cycle to be programmed either before or after the powder coating process is executed. The control system automatically initializes and brings each of the gun controls to an operable state on-line with the system control.

10 Claims, 9 Drawing Sheets

DISTRIBUTED CONTROL SYSTEM FOR POWDER COATING SYSTEM

This application is a continuation application of U.S. Ser. No. 09/198,358, entitled "Distributed Control System For Powder Coating System", filed Nov. 24, 1998, now U.S. Pat. No. 6,017,394, which in turn is a continuation application of U.S. Ser. No. 08/896,696, filed Jul. 18, 1997, now U.S. Pat. No. 5,843,515, which in turn is a divisional application of U.S. Ser. No. 08/320,882, filed Oct. 5, 1994, now U.S. Pat. No. 5,718,767.

FIELD OF THE INVENTION

The present invention relates generally to a powder coating system and more particularly to a distributed control system providing a gun control for each spray gun which selects a particular one of a plurality of stored sets of powder dispensing parameters and independently controls the triggering of its powder spray gun.

BACKGROUND OF THE INVENTION

A powder coating system sprays an electrostatically charged airborne powder within an enclosure or booth containing the part or article to be coated. The electrostatic potential between the powder and the article causes the powder to be attracted to and move into contact with the surface of the article. The deposited powder is then heated so that it flows and hardens on the surface on which it has been deposited.

The present invention relates to two areas of powder spray control. First is the selection and control of certain spray parameters, for example, the powder flow air pressure, the atomizing air pressure and pattern air pressure, if required. In addition, with corona type spray guns, an electrostatic voltage is selected and supplied by an internal power supply. The second area of powder spray control is gun triggering, that is, when the spray gun is turned ON and OFF, in relation to parts traveling through the spray booth. In the most basic systems, the air pressures and electrostatic voltage are controlled by manually setting respective pressure regulators and a power supply, and the gun triggering is also manually controlled.

Some systems have been developed that automate the gun triggering. For example, the "SMART SPRAY®" gun controller which is manufactured and sold by Nordson Corporation of Amherst, Ohio, the assignee of the present invention, uses a microprocessor based gun controller in combination with manually set pressure regulators to automatically control the spray gun triggering. The gun controller operates with photodetectors in the spray booth to provide gun triggering in different spray booth zones. Either a conveyor feedback transducer or control timer is used with the photodetectors to detect the presence of a part as well as its front and rear edges as it travels through the booth, and the gun controller triggers the gun ON and OFF in response to the photodetectors sensing part presence. However, the spray parameters remain constant unless they are manually changed by the operator.

In other systems, a programmable logic controller ("PLC" is used as a centralized powder spray system control in association with photodetectors and a conveyor feedback transducer. The photodetectors and a feedback transducer from the conveyor sense the presence and identity of different parts, respectively, to be coated, as well as line gaps between successive parts on the conveyor. The PLC can be operatively connected to voltage to pressure transducers for selecting the desired powder air flow, atomizing air and pattern air pressures. The centralized PLC turns selected spray guns ON or OFF as a function of the part identified and line gaps between parts.

While the above systems have performed satisfactorily, they utilize a centralized controller or PLC which singularly controls the triggering of each of the spray guns, and further, singularly controls each of pressure regulators and each of the power supplies for each of the guns. This centralized system control configuration has a disadvantage of requiring extensive wiring within the painting facility much of which must be done upon installation at the user's site. Moreover, a PLC is not adept at performing complex arithmetic operations and handling more complex data structures. PLC's have the further disadvantage of only providing a limited amount of process status information to the operator or other analytical devices. Furthermore, the use of a PLC as the centralized control system has a further disadvantage in that it is difficult and expensive to change the electrical configuration of the control system. Also, there is no redundancy in a centralized PLC control system and any electrical failure within the PLC will terminate the operation of the entire coating system.

Still further, because the single centralized PLC must serially process data for each of the powder dispensers, there is a further disadvantage in that the processing bandwidth, that is, the real time window in which the PLC can dedicate to processing data for a particular powder spray gun is relatively small. Therefore, more comprehensive control of the powder spray cycle is very difficult. For example, with a centralized control, a gun purge cycle to clean the dispensing hose and spray gun is not programmable. When the spray gun is triggered ON, powder is pumped from the powder source, through a dispensing hose up to thirty feet long and then through the spray gun. When the spray gun is triggered OFF, the fluidizing air pressure in the dispensing hose is terminated; and therefore, the powder in the dispensing hose separates from its transport air and often settles and collects in lumps or clumps in the hose. When the spray gun is again triggered ON, the powder lumps are sprayed in an uneven manner. With the prior control systems, a gun purge cycle is manually controlled by the operator when it is required.

Finally, as the system size, in terms of the number of powder dispensers and spray guns increases, the added complexities of using a single centralized PLC cause its costs to increase substantially.

SUMMARY OF THE INVENTION

To overcome the disadvantages described above and to provide a highly flexible control system with capabilities not previously found in centralized powder coating control systems, the present invention eliminates the centralized control of all of the spray gun functions and provides a powder coating control system wherein control is distributed in a new and more efficient manner, thereby minimizing of wiring within the powder spray booth. The triggering and selection of spray parameters of each of the powder spray guns within the control system of the present invention is independently and individually controlled by its own gun control so that each gun is capable of more comprehensive powder coating process control. Therefore, the control system of the present invention has greater flexibility and reliability with less complex wiring. The control system of the present invention is particularly beneficial in being able to select different sets of powder dispensing parameters on-line and in real time to make the powder coating process more efficient and cost effective.

According to the principles of the present invention and in accordance with the described embodiments, a powder coating system includes a plurality of powder spray guns disposed with respect to an article to be coated. Each of the powder spray guns is connected to its own gun control which stores a set of spray parameters and triggers its spray gun ON and OFF to apply a powder coating in accordance with the stored spray parameters. A communications network is in electrical communication with the plurality of gun controls. Providing a control for each powder spray gun results in a control system that is modular, highly flexible and provides a more comprehensive powder coating process control. A dedicated control for each powder spray gun has the advantage of being able to report more process status information to the operator control, thereby permitting more comprehensive statistical process control as well as more sophisticated automatic diagnostic procedures. The communications network advantageously simplifies the wiring between control components within the coating system, thereby reducing the cost of installation. With multiple controls, a failure of one control does not necessarily require the powder coating operation be completely shut down thereby providing further advantages in efficiency and cost savings.

In a further embodiment of the invention the powder coating system includes a sensor responsive to a conveyor moving the part past the spray gun which can be used to provide system signals representing first, a change in the position of the part, and second, a physical characteristic of the part. Therefore, the spray parameters may be changed in real time as one or more parts or portions of parts are moved through the spray booth.

In another embodiment, each of the gun controls in the powder coating system includes a network interface, a memory for storing sets of spray parameters, a digital to analog converter and a processor for triggering its respective spray gun ON and OFF to apply a powder coating in accordance with the stored set of spray parameters. In a still further embodiment, the powder system control includes a system control connected to the communications network for providing data to and receiving data from the gun controls.

In another aspect, the invention includes a method of applying a powder coating on a part moving with respect to powder spray guns by storing a plurality of presets of spray parameters in each of a number of gun controls connected to a like number of powder spray guns. The part to be coated is detected and the appropriate gun controls are activated to select a preset of gun operating parameters as a function of detecting the part. The above method can be implemented by each of the gun controls selecting different presets of spray parameters in response to detecting different physical characteristics of one or more of the parts or portions of the parts. In a further aspect of the above method, the different presets of spray parameters are detected in response to detecting changes of position and different physical characteristics of the one or more parts moving with respect to the powder spray guns.

In another embodiment of the invention, a gun purge cycle is programmable and automatically executed as part of a standard powder spraying process. With a tribo gun, in which the electrostatic charge is created by the static electricity of the powder flowing through the spray gun, it has been found that purging is desirable prior to the execution of a powder spraying process. With the present invention, a purge-on cycle may be programmed to automatically purge only the spray gun after the part has been detected but prior to the part arriving at the spray gun. Further, at the end of a powder spraying process, a purge-off cycle may be programmed to use pressurized air to automatically clean the powder dispensing hose and the spray gun of excess powder. Consequently, the invention provides an automatic powder spray cycle that prevents the surging and spitting of undispensed powder at the start of powder dispensing cycles. Therefore, another advantage of the invention is that, for the first time, a powder dispensing process can be programmed that changes powder spray parameters in real time.

In a still further embodiment, the invention includes a method of operating a powder coating system in which the plurality of gun controls are automatically initialized and brought on-line in a fully operable state without any operator intervention. The control system has the capability of detecting when one gun control is replaced by another, or when a new gun control is added to the system. Consequently, the method provides a significant savings in system downtime and operator time that would be otherwise required to initialize the gun controls.

The above methods of operating a powder coating system permit a highly flexible powder coating process in which the operating parameters may be quickly changed on-line in real time with the advantage of providing a more uniform powder coating and a more efficient powder coating process. These and other objects and advantages of the present invention will become more readily apparent during the following detailed description in conjunction with the drawings herein.

DETAILED DESCRIPTION OF THE INVENTION

Figure 1:
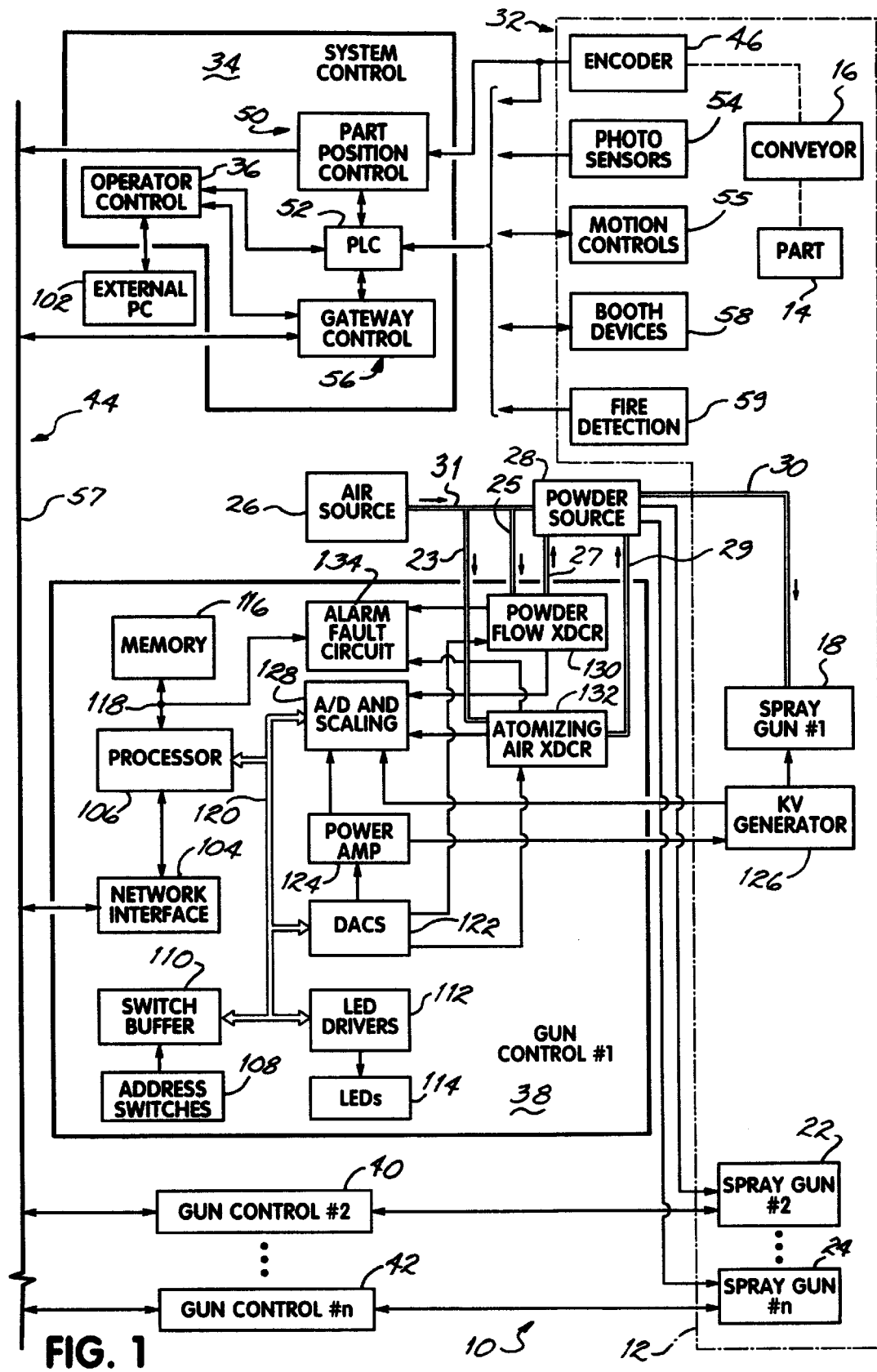
FIG. 1 is a schematic block diagram of the powder coating system of the present invention.

FIG. 1 illustrates a preferred embodiment of the powder coating system 10 of the present invention. The system 10 includes a powder spray booth 12 shown in phantom in which an article or part 14 to be coated is mechanically supported on a conveyor 16. A powder coating is electrostatically deposited on the part 14 and is subsequently heated to cause the powder coating to flow together and harden on surfaces of the part. The powder is sprayed on to the part from an electrostatic powder spray gun 18. Other powder spray guns 22, 24 are also located in the powder spray booth 12 at different locations to spray, either at the same or different elevations, different portions of the same part, or, different parts at the same or different elevations, or, different surfaces, etc.

In a well known manner as is described in the Gimben, et al. U.S. Pat. No. 5,167,714, assigned to the assignee of the present invention, pressurized air, such as "shop air" is dried and distributed to an air distribution and flow control panel or air source 26. The dried air is supplied in air lines 23, 25 to voltage to pressure transducers, or regulators, 130 and 132. The powder flow transducer or regulator 130 supplies air at a regulated pressure for powder flow in air line 27 to a powder source 28. If a tribo gun is being used, the atomizing air transducer or regulator 132 supplies air at a regulated pressure directly to the gun. If a corona spray gun is being used, the atomizing air transducer supplies air at a regulated pressure to a powder pump (not shown) in the powder source 28 in air line 29 as illustrated in FIG. 1. The powder source 28 includes a bulk powder source (not shown) in which the powder is fluidized by air supplied thereto in air line 31 from the air source 26. The powder is pumped from the bulk powder source by the powder pump to a cyclone and sieve unit (not shown) generally mounted on top of a feed hopper (not shown), all of which are within the powder source 28. The powder is separated from the transport air in the cyclone, is then cleaned in the sieve and deposited into the powder feed hopper. The feed hopper is also connected to the air source 26 so that the powder therein is maintained in a fluidized state prior to being pumped from the powder source 28, through a powder dispensing hose 30 to the powder spray gun 18. Sprayed powder which is not deposited on the part is recovered in the spray booth, cleaned and recycled to the power source 28 by mechanisms which are not shown, but are known in the art.

The spray booth control system 32 includes a system control 34 which is directly responsive to devices in the spray booth 12. The system control 34 is connected to a plurality of gun controls 38, 40, 42 associated with respective powder spray guns 18, 22, 24 over a communications network 44. Any of the powder spray guns 18, 22, 24 may be mounted on motion controls 55, for example, oscillators or reciprocators, which are activated by the system control 34 in response to motion of the part 14 through the spray booth 12. Further, as is well known, a programmable logic control ("PLC") 52 within system control 34 provides actuation signals to, and is responsive to input signals fed back from booth devices 58. The booth devices include those devices associated with the spray booth that are necessary for and inherent within the powder spraying process per se. For example, the PLC operates to turn ON and OFF booth devices, such as, sieve motors, exhaust fans, solenoids, etc.; and the PLC receives input or feedback signals from devices such as push-buttons, interlocks, limit switches, overhead switches, fire detection devices 59, etc. The fire detection devices 59 are typically provided by a combination of ultraviolet and infrared detectors.

Figure 2:
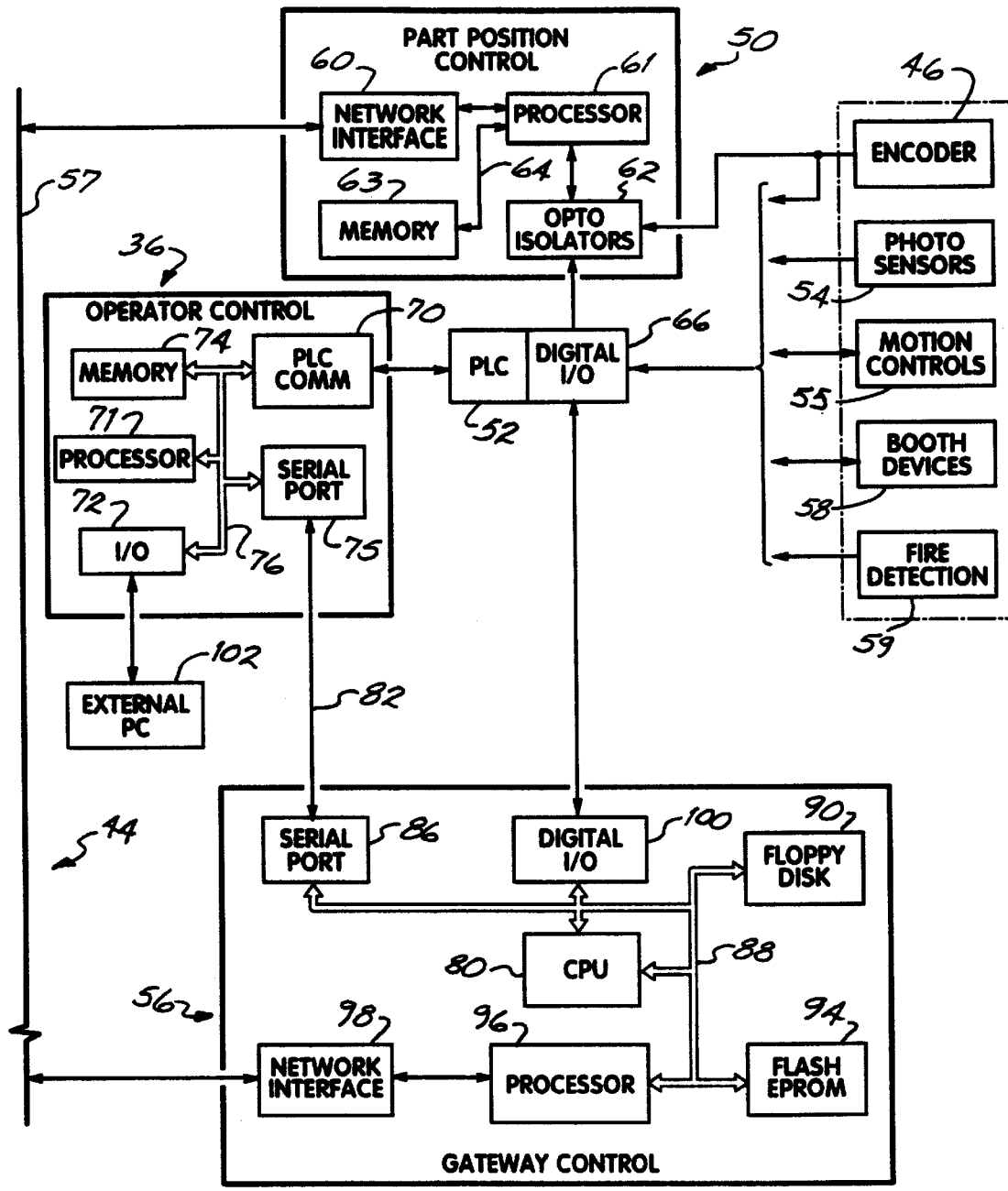
FIG. 2 is a schematic block diagram of the system control illustrated in FIG. 1.

The various components within the system control 34 are shown in more detail in FIG. 2. A part position control ("PPC") 50 includes a twisted pair transceiver network interface 60 which is part of the communications link with the PPC processor 61. The PPC processor 61 is preferably implemented using a "NEURON CHIP" 3150 processor commercially available from Motorola, of Phoenix, Ariz. Development tools and software for the "NEURON CHIP" processor are commercially available from Echelon Corporation of Palo Alto, Calif. The PPC processor 61 receives digital binary signals from opto-isolator interface circuits 62, which, in turn, have inputs connected to an output from the PLC 52 and the quadrature output of the conveyor encoder 46. The PPC 50 also has a memory 63 including EPROM and RAM which is connected to the processor 61 by an address/data bus 64. The PPC 50 functions to create part position signals for distinctive encoder counts in response to the motion of the conveyor and to transfer a part identity and part position signal or encoder count across the communications network 44 to all of the gun controls 38, 40, 42. The encoder 46 provides first system signals, that is, an output pulse or count, with successive incremental displacements of the conveyor 16. The encoder is preferably "ACCU-CODER" encoder with quadrature outputs commercially available from Encoder Products Co. of Sandpoint, Ind.

The PLC 52 is typically implemented using a Model PLC 5 commercially available from Allen-Bradley of Milwaukee, Wis. Such a control typically includes digital input/output ("I/O") interface circuits 66, which receive and provide binary signals from and to, respectively, the various controls and devices 46, 54, 55, 58, 59 within the spray booth 12. The PLC 52 is responsive to the states of the photosensor, or photodetector array 54 detecting the presence of the part, or physical characteristic of the part, to create second system signals, that is, a corresponding part identification signal or code, and transmits the part identification code to the PPC 50 for subsequent transmission to the gun controls 38, 40, 42.

An operator control 36 is connected to the PLC 52 by means of a PLC communications card 70. The operator control 36 is preferably implemented with a commercially available industrial computer 71 of the type having a 486 processor such as a Model 9450 from Xycom Inc. of Saline, Mich. The PLC communications card 70 is typically supplied by the manufacturer of the PLC 52 and is designed to be plug compatible with and provide a bidirectional communication link between the PLC 52 and the personal computer comprising the operator control 36. The operator control further contains input/output ("I/O") devices 72 which may include push buttons, switches, a screen display, and other devices that allow and facilitate the loading of powder spray parameters and other data into the operator control 36 and display powder coating process conditions to the operator. The I/O devices 72 may also include a modem or a network connection to again facilitate the transfer of data to and from the operator control 36. The network devices 72 may further include an interface to connect the operator control 36 to an external personal computer 102. The computer 102 may be used for statistical process control for the powder coating process or other functions. The operator control processor 71 is connected to the PLC communication card 70, the I/O devices 72, memory 74, and a serial port 75 by means of a standard ISA bus 76. The 71 processor is preferably running a "WINDOWS" "DOS" operating system. Within the "WINDOWS" environment, the "IN TOUCH" program commercially available from Wonderware of Irving, Calif. is used to provide a man-machine interface.

The gateway central processing unit ("CPU") 80 is also preferably a computer having, for example, a 486 processor executing a "DOS" operating system. The CPU 80 is connected to a standard ISA bus 88 which, in turn, is connected to a serial port 86 and to various memory devices, such as a floppy disk 90, nonvolatile flash EPROM 94. The gateway control 56 communicates with the individual gun controls 38, 40, 42 by means of a gateway processor 96 connected between the bus 88 and a twisted pair transceiver network interface 98. The gateway processor 96 is preferably a "NEURON CHIP" 3150 digital processor that executes "MIP" software also commercially available from Echelon Corporation of Palo Alto, Calif. The purpose of the "MIP" software is to permit the gateway CPU 80 to communicate with the "NEURON CHIP" processor 96. The gateway communications processor 96 is contained on a circuit board that is available from Ziatech Corp. of San Luis Obispo, Calif. The gateway control 56 functions primarily as a system database and stores in the nonvolatile memory 94 a database that has the operational status of each network node, that is, each gun control 38, 40, 42. The database includes up to 32 groups, or sets, or presets of spray parameters for each gun control, system configuration data, etc. The gateway control 56 also functions as a network manager and event processor which decodes various event states and creates associated messages, if required.

The operator control 36 communicates with the gateway control 56 over a serial communication line 82, connected between respective serial port 75 in the operator control 36 and serial port 86 of the gateway control 56. The operator control processor 71 and the gateway CPU 80 communicate by means of a low level protocol that simulates a fully duplexed RS-232 serial bus communication between universal asynchronous receiver transmitters. That low level protocol defines the structure of packets of data transferred over the serial bus between the receiver transmitters and the details of the communications protocol. That low level protocol runs in both the operator control processor 71 and the gateway CPU 80 in order to move data between the serial ports 75, 86. A second higher level communications protocol, which is an application level interface for the low level protocol runs on the operator control processor 71 and the gateway CPU 80 to interpret the commands which are created by the low level protocol. The higher level protocol controls the routing of data and control functions within the operator control 36 and the gateway control 56.

The gateway control 56 communicates with the PLC 52 by a digital I/O interface 100 which is connected to the digital I/O interface 66 within the PLC 52. The digital I/O interfaces 66, 100 are connected by a group of parallel lines that provide discrete signals between the PLC 52 and the gateway control 56. Therefore, the PLC 52 can respond to a condition it senses within the spray booth 12 and provide a remedial command signal to the gateway control 56 for immediate action.

Referring to FIG. 1, the communications network 44 is a local operating network ("LON"), which is efficient at transmitting small packages of data at high speeds between the PPC 50 and the gun controls 38, 40, 42, as well as between the gateway control 56 and the gun controls 38, 40, 42. The communications network or LON 44 includes the commercially available "NEURON CHIP" 3150 processors, which comprise the PPC processor 61, the gateway processor 96, and gun control processor 106; the twisted pair transceiver network interfaces 60, 98, and 104; and the communication media or link 57 which is preferably a twisted pair cable and carries the communications between the network interfaces. The LON 44 is supported by the "LONWORKS™" technology commercially available from the Echelon Corporation. Data is exchanged across the media 57 and between the transceivers 60, 98, 104 and respective "NEURON CHIP" processors 61, 96, 106 in accordance with a "LONTALK" communications protocol being executed by communications software running in the "NEURON CHIP" processors 61, 96 and 106.

The gun controls 40, 42 are identical to the gun control 38 shown in detail. The gun control 38 is connected to the communications network 44 by means of a twisted pair transceiver network interface 104 and a gun control processor 106 comprising a "NEURON CHIP" 3150 processor as noted above. Address switches 108 are set by an operator to a selectable, unique address that identifies the physical designation of the gun control itself, and the physical designation or the identity of the physical location of the connector receiving the circuit board containing the gun control 38. The switch buffer 110 provides an interface buffer for the switch settings. LED drivers 112 are connected to LED's 114, which provide visual signals to indicate the gun is turned ON or triggered, the auto, manual, and off line modes of operation, a communications fault, a control hardware fault, etc. Generally, it is preferable to continue the powder spraying process as long as possible; and therefore, the LED's provide a fault indication to the operator who then may determine the appropriate remedial action. Control 38 has memory 116 which includes a 64 K×8 EPROM and a 32×8 RAM connected to the dispenser controller 106 over an 8 bit bus 118.

The gun control processor 106 transmits an electrostatic voltage parameter from memory 116 over a serial peripheral interface ("SPI") bus 120 to one of a group of 8 bit serial digital analog converter ("DACS") 122. One of the DACS 122 provides a current signal to power amp 124, which provides an amplified current at an appropriate voltage level to the KV generator 126 mounted to corona type spray gun 18. The KV generator 126 is effective to provide the desired electrostatic charge to the powder being dispensed by the spray gun 18. Tribo type powder spray guns may also be used. The connection of the powder spray guns and the gun controls includes an extra signal line that provides a binary signal indicating whether the powder spray gun is either a corona type or tribo type of gun. The power amp 124 also provides a current feedback signal to the analog to digital converter and scaling circuit ("A/D converter") 128 as a function of the current signal supplied to the KV generator 126. With a tribo type of gun, a desired current feedback is included in the preset spray parameters in place of the electrostatic voltage preset for the corona type gun. The feedback current is selected to be in a range greater than preset current feedback and less than 20 microamps. In the case of tribo type guns, the processor 106 receives the output from the A/D converter 128 to determine whether the current feedback signal is within predetermined limits.

During a powder dispensing process, the gun control processor 106 will also read from the memory 116 various other parameters, for example, atomizing air pressure, powder flow pressure, and pattern air pressure. Those parameters are converted into analog signals by the DACS 122 and provided to the appropriate transducers, for example, the powder flow air transducer 130 and the atomizing air transducer 132. The transducers 130, 132 are preferably voltage to pressure transducers available from Nordson Corporation as Part No. 159 686. The transducers 130, 132 function as pressure regulators to provide a regulated output pressure to the powder pump in the powder source 28 as a function of the input signal voltage received from the DACS 122. Those regulated pressures are utilized for their appropriate purpose in a manner well known in the art. In addition, the transducers 130, 132 provide buffered analog voltage pressure feedback signals as a function of their regulated output pressures to the A/D converter 128 and a binary fault signal in the event of a transducer malfunction to the alarm fault circuit 134.

Each atomizing air transducer either is connected to a powder pump of a respective corona spray gun, or is connected to the rear of a tribo type of spray gun. The atomizing air transducers either control the density of the powder being conveyed from the powder pump in a corona gun, or the velocity of the powder being discharged in a tribo type of gun. Each powder flow transducer is connected to a respective powder pump and controls the flow rate at which powder is supplied to the spray gun. Although not shown, a pattern air transducer may be connected to the spray gun to control the dispensing pattern of the powder.

Figure 3:
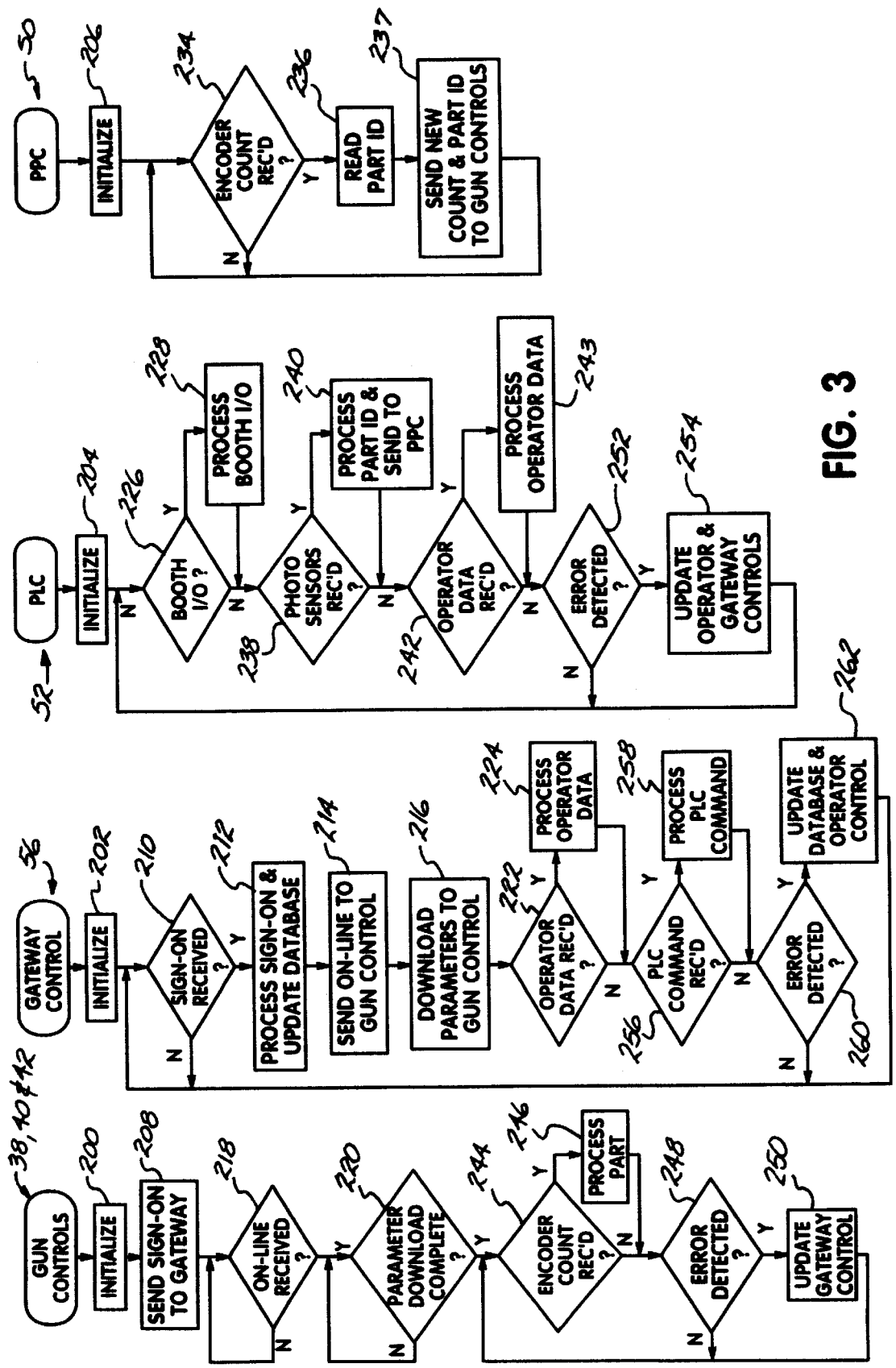
FIG. 3 is a set of flowcharts illustrating the general operation and interrelationship between the controls within the powder dispensing control system of the present invention.

FIG. 3 is a flowchart illustrating the general function and operation of the gun controls 38, 40, 42 the gateway control 56, the PLC 52, and the PPC 50. When power is applied to the controls, or upon a reset of any of the individual controls, each of the controls executes a respective initialization process 200, 202, 204, 206. The initialization process will vary somewhat with each control; but in general, initialization turns off all hardware outputs, clears default states and performs memory checks and other hardware checks. The amount of diagnostic testing that is performed on a control reset is a matter of design choice.

After the initialization process is completed, each of the gun controls 38, 40, 42 at 208 sends a sign-on signal to the gateway control. Upon receiving the sign-on signal from each of the gun controls at 210, the gateway control at 212 sequentially processes each of the sign-on signals and updates a status bit in the database within the gateway control indicating that communication is established with the respective gun control associated with the sign-on signal. The gateway control 56 then sends at 214 an on-line signal to the respective gun control. In addition, the gateway control at 216 begins to download the spray parameters stored in the database associated with that gun control. Upon receiving the on-line signal at 218, the gun control then begins receiving and storing the spray parameters which are being downloaded by the gateway control. After all of the parameters have been downloaded at 220, the gun control is ready to begin processing a part.

In the situation where a new part is being introduced to the spray booth, no spray parameters may exist in the gateway control and the operator may choose to run the system manually to determine which of the parameter values should be used to most efficiently process the part. In the manual mode, the control system tracks the part as it moves through the conveyor booth. The electrostatic charge, flow pressure, atomizing air pressure, and pattern air pressure may be manually selected; and the powder spray gun manually operated. Once the spray parameters have been determined, the operator may then utilize the off-line mode to enter data, for example, motion dependent spray parameters associated with a particular part. In the off-line mode, the control system tracks the part as it moves through the spray booth; however, the spray guns are disabled, that is, they cannot be triggered ON while in the off-line mode. After all the spray parameters have been established and downloaded to the gun controls, the operator switches to the auto mode during which the part is automatically detected, identified, tracked and coated as it moves through the spray booth. In response to motion of the part through the spray booth, different sets of spray parameters at each of the gun controls is selected; and powder is dispensed accordingly. During the auto mode, the operator is also able to use the operator control 36 to enter data. In any of the above modes, the gateway control 56 detects data entered by the operator at 222 and processes that data at 224. In executing the above modes of operation, the PLC 52 detects at 226 and processes at 228 signals from the devices in the spray booth. In addition, the PLC detects at 238 and processes at 240 the states of the photosensors 54 within the spray booth in order to determine the identification of the part being processed.

Upon the PPC 50 receiving the quadrature encoder pulse and creating an encoder count at 234, the PPC reads at 236 the part identification code provided by the PLC 52. The PPC then at 237 transmits the part identification code and encoder count across the communications network 44 to the gun controls which are currently recognized as being on-line by the gateway control 56. The gun controls at 244 detect the part identification code and encoder count sent by the PPC 50, and each of the gun controls keeps track of the position of the part within the booth relative to the detection of the part by the photodetectors. Each of the gun controls then at 246 independently determines whether it has a set of spray parameters associated with the part identified by the photosensors, and if so, the gun control executes a powder coating cycle.

If, during its operation, a gun control detects at 248 errors in the process, for example, one or more of the pressure feedbacks exceeds a high or low limit. The gun control will at 250 illuminate one or more of the LEDs on the gun control itself and send the error signal to the gateway control which sends the error signals to the operator control 36 for display to the operator. The gun controls 38, 40, 42 will preferably detect a pressure error when the feedback signal indicates that the pressure is, for example, 5 psi, above or below the preset pressure parameter. Other errors will be detected when the gun control does not initialize properly, when other hardware faults are detected, when an emergency stop is detected, when an excessive number of encoder counts have been missed, etc.

In addition, the PLC at 242 detects whether data has been received from the operator control; and if so, the PLC processes that data at 243. The PLC also detects other errors at 252 which are caused by problem conditions detected in the spray booth or improper or illogical operator requests or conditions, etc. Upon those errors being detected, the PLC at 254 updates the operator and gateway controls so that those error states can be respectively displayed to the operator and other action taken if necessary. The gateway control 56 determines at 256 whether any commands have been received from the PLC. If so, gateway control processes the PLC commands at 258. In addition, the gateway control at 260 detects other errors, for example, errors in processing the part that are received from the gun controls. Further, a communications error between any of the gun controls 38, 40, 42 and the gateway control 56 may result in the on-line status bit for one of the gun controls being set to the off-line condition which will require a full resetting and reinitialization of the gun control in order to reestablish its on-line status. The error conditions detected at 260 by the gateway control are processed at 262 by either updating the database as required and/or sending the error signal to the operator control for display to the operator.

FIGS. 4–8 are flowcharts illustrating the details of several programs or routines being executed by the processors within the gun controls 38, 40, 42. FIGS. 9–12 are programs or routines operating within the gateway CPU 80 of the gateway control 56. One important feature of the invention is the ability of the spray booth control system 32 upon a power up or a reset to automatically initialize the gun controls 38, 40, 42 to a fully operable state and automatically connect the gun controls on-line over the communications network 44 with the gateway control 56. Further, if any circuit board containing a gun control is replaced by a different circuit board, the booth control system 32 automatically detects the replacement board and brings the new gun control to an on-line operable condition.

Figure 4:
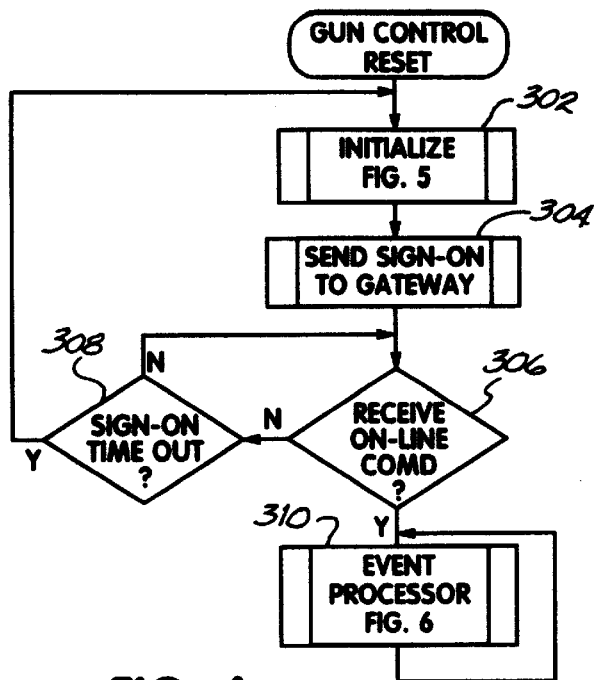
FIG. 4 is a flowchart of the main reset routine being executed in each of the gun controls of the present invention.
Figure 5:
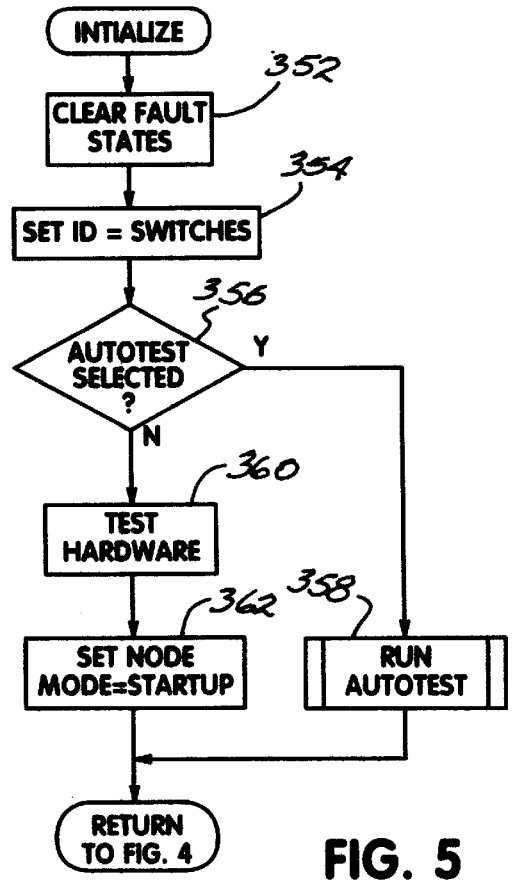
FIG. 5 is a flowchart of an initialize subroutine executed by the main reset routine of FIG. 4.

The interaction between the gun controls 38, 40, 42 and the gateway control 56 to automatically bring a gun on-line will be described with regard to FIGS. 4, 5, 9 and 10. The gun control reset or power-on routine is illustrated in FIG. 4 and is initiated in response to power being applied to the gun control or in response to a gun control reset being initiated by the operator or the control system. The general initialization process or subroutine 302 is illustrated in FIG. 5. As shown at 352, the control first clears any fault states and in addition turns off hardware outputs. Next at 354, the gun control sets its identification in the switch buffer 110 equal to the state of the address switches 108. Thereafter, if, at 356, an auto test has been selected by the operator, the auto test is executed at 358 to test the operation of the transducers 130, 132. If no auto test has been selected, the initialization subroutine continues at 360 to do other diagnostic hardware tests, such as memory checks, etc. After the hardware testing is complete, the initialize subroutine sets the node mode to the start up mode at 362 and returns to the gun control reset routine of FIG. 4. After initialization, the gun control at 304 sends a sign-on message to the network manager function within the gateway control 56. The sign-on message includes a sign-on command code, the gun control identification established by the address switches 108, the type of node represented by the gun control, the software version identification running within the gun control processor 106, and a fixed, nonselectable 48 bit "NEURON CHIP" processor identification code assigned by its manufacturer, the Echelon Corporation, for the particular chip which is installed as the processor 106.

Figure 9:
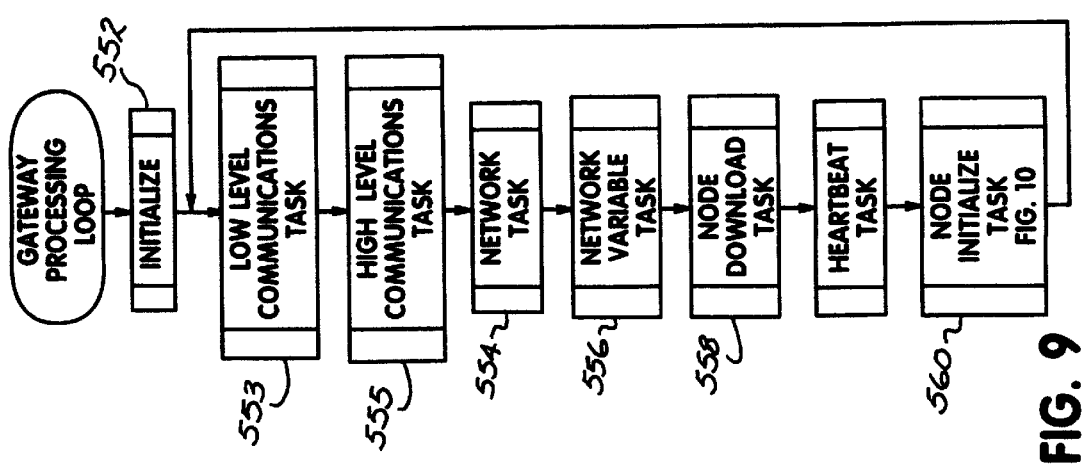
FIG. 9 is a flowchart of the main processing loop executed by the gateway control within the system control of the present invention.

FIG. 9 is a flowchart illustrating the gateway processing loop that is running within the gateway CPU 80. Upon the application of power to the gateway control 56 or upon some other master reset command, an initialize subroutine is executed at 552 which tests and initialize the outputs, the memory, and other hardware associated with the gateway control 56. In addition, the initialize subroutine will call each of the other task subroutines within the gateway processing loop of FIG. 9 and initialize each of those subroutines.

After initialization, the gateway control processing loop steps through various subroutines as illustrated in FIG. 9 performing the network management tasks represented by the subroutines. For example, when the gateway control 56 and operator control 36 exchange data over the serial link 82, the low level communications task 553 in the gateway processing loop is executed. At the same time, a the low level communications task is executed in the operator control; and the gateway control either transmits data to or receives data from the operator control across the serial link 82 in accordance with the low level communications protocol. When appropriate, the gateway processing loop will also execute the high level communications task 555 which upon the receipt of data interprets the low level communications protocol commands and routes data and control functions within the operator control. Prior to transmitting data, the high level communications task 555 will from the data to be transmitted to the operator control create the necessary low level communications commands required by low level communications task. A high level communications subroutine or task also runs in the operator control 36 to interface with the low level communications protocol running therein.

When one of the gun control nodes sends a sign-on message across the communication network 44 to the gateway control 56, the network task subroutine 554 is executed within the gateway CPU 80 to control the queuing and flow of incoming messages to the gateway control 56 from the various gun controls 38, 40, 42. In addition, the network variable task subroutine 556 is executed by the gateway CPU 80 to identify the type of message being received by the gateway control. The message is validated and then message processing is initiated. For example, the message may require that new data be entered into the database. Alternatively, the message may require that its content be forwarded on to either the PLC 52 or the operator I/O 36.

Figure 10:
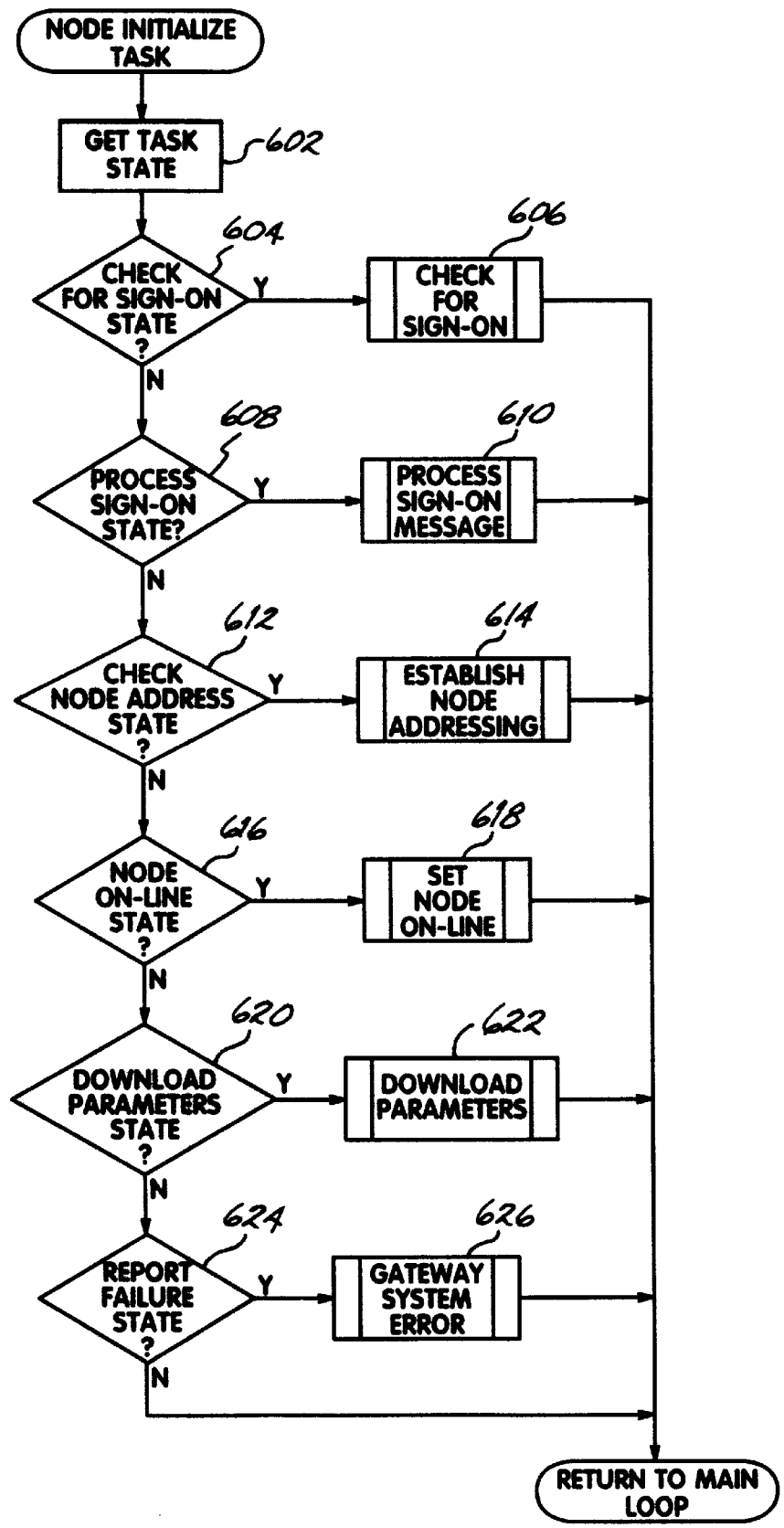
FIG. 10 is a flowchart of the gun control node initialize subroutine executed by the main processing loop of FIG. 9.

In response to receipt of a sign-on message, the node initialize task subroutine 560 is executed to establish the communication link between the gateway control 56 and each of the gun controls 38, 40, 42. The details of the node initialized task subroutine 560 are illustrated in FIG. 10. Referring to FIG. 10, the node initialize process first retrieves the current task state at 602 which is assumed to be the check for sign-on state. The process at 604 detects that state and executes the check for sign-on subroutine 606. The sign-on subroutine 606 sequentially increments through each node address in the system and determines whether a sign-on message has been transmitted across the communication network 44 by that node. If it detects a sign-on message for a particular node, the task state is set to the process sign-on state, the sign-on state flag is reset, and a pointer is assigned to the sign-on message received. The initialize task subroutine detects the process sign-on state at 608 and executes a process sign-on message subroutine 610 as shown in FIG. 11.

Figure 11:
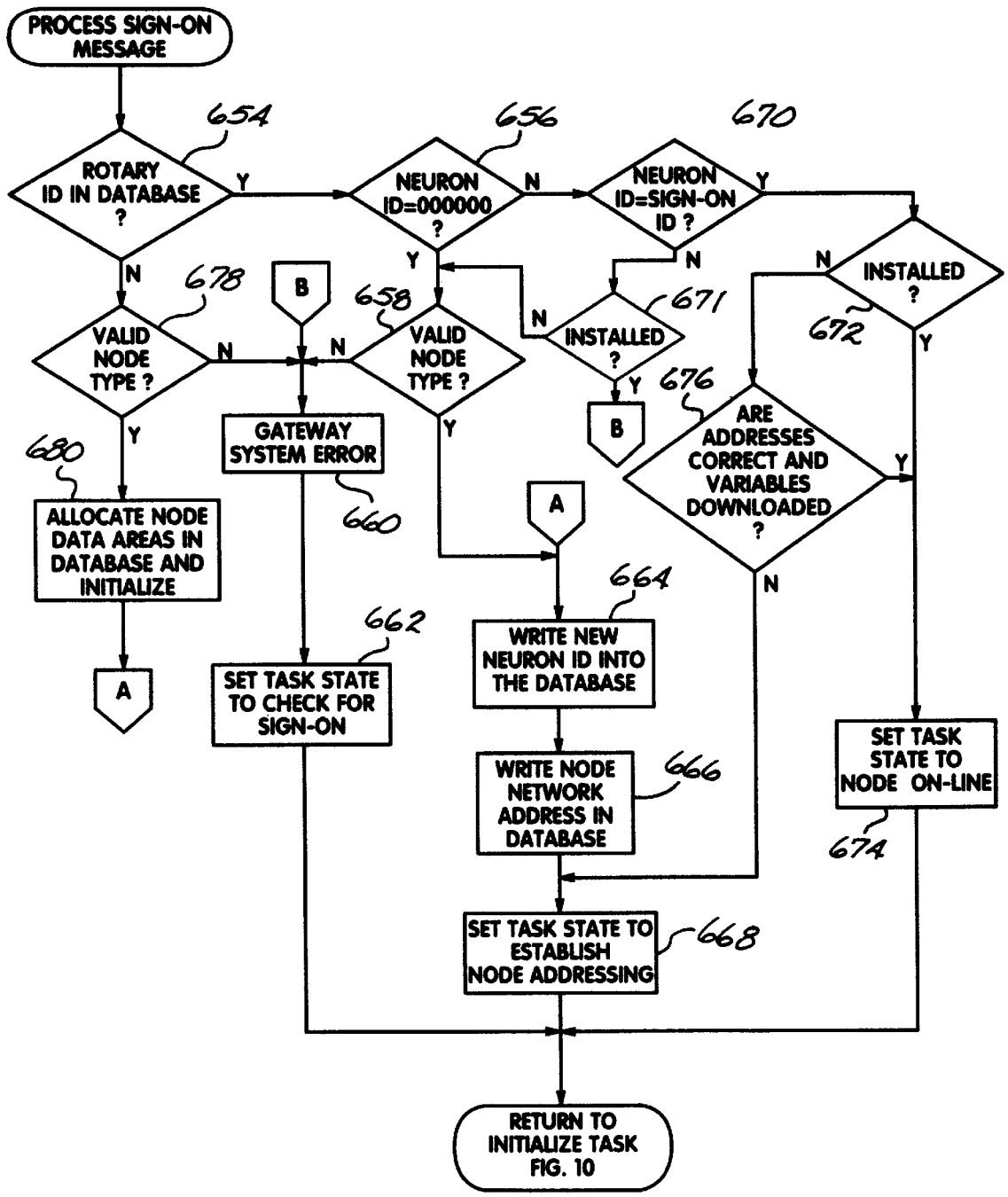
FIG. 11 is a flowchart of a process sign-on message subroutine executed by the gun control node initialize subroutine of FIG. 10.

Referring to FIG. 11, the process sign-on message subroutine goes to the first pointer assigned to a sign-on message and determines at 654 whether the address switch identification within the sign-on message exists within the database in the nonvolatile memory 94 of the gateway control 56. In some situations, an applications engineer or the operator may use the operator control 36 to enter data into the database which preassigns a gun control identification which is then manually set in the address switches 108. However, the identification code of the particular "NEURON CHIP" processor used with the addressed gun control is not known in advance by the engineer or operator. Therefore, when the gun control identification is assigned, an identification code of zero is entered into the "NEURON CHIP" processor identification field within the database. Consequently, if at 656, the process finds a zero entity in that field, it is assumed that the initialization process for that particular gun control is being executed for the first time. The process then at 658 reads the node type contained within the sign-on message from the gun control to validate that the node is a gun control node. If a different node type is detected, for example, the PLC node, a gateway system error subroutine is executed at 660, and the initialization task state is set to the check for sign-on state at 662. If a valid node type is detected at 658, the "NEURON CHIP" processor identification code contained within the sign-on message is written into the database at 664 in association with the address switch identification contained in the sign-on message. Next, at 666, the gun control or node network address is written into the database; and at 668, the process sets the initialization task state to establish node addressing so that addressing variables may be downloaded to the gun control.

If the process at 656 detects that the "NEURON CHIP" processor identification code is not equal to zero, the process assumes that the gun control has previously signed on to the system. Therefore, at 670 the process determines whether the "NEURON CHIP" processor identification code in the database for the switch identification is equal to the "NEURON CHIP" processor identification code contained in the sign-on message. If it is, the process then at 672 checks the gun control installed status bit; and if the status flag indicates that the identified gun control is installed, the process at 674 sets the task state to the node on-line state. As will be subsequently described, the on-line command is then transmitted to the gun control and the spray parameters are downloaded.

If at 672 the subroutine determine that the installed status bit indicates that the gun control or node is not installed, then the process at 676 checks to determine whether the network node variables have been downloaded and whether the network addressing for the gun control is correct. If not, the subroutine at 668 sets the initialize task state to establish network node addressing so that the correct network addressing variables can be downloaded to the node.

If at 670 the "NEURON CHIP" processor identification code in the database is not the same as the "NEURON CHIP" processor identification code contained in the sign-on message, the process assumes that the gun control circuit board containing the "NEURON CHIP" processor identified in the database has been replaced by a different gun control circuit board which contains the "NEURON CHIP" processor identification code in the sign-on message. The process then at 671 detects whether the status bit associated with the sign-on address switch identification or code found in the database is set to the installed state. If it is, that means that the sign-on address switch code is a duplicate of an address switch identification already stored and installed in the database. Two gun controls cannot have the same address switch identifications; and therefore, the if that condition is detected, a system error is set at 660. If the process detects at 671 that the sign-on address switch identification is not installed in the database, the process then at 658 determines whether the sign-on message contains a valid node type identification. If it does not, a system error is set as previously described at 660. However, if a valid node type is detected at 658, the "NEURON CHIP" processor identification code in the sign-on message is loaded into the database at 664 along with the network address at 666; and the initialization task state is set to establish node addressing at 668 so that the appropriate addressing and other variables may be downloaded to the new "NEURON CHIP" processor. The process just described covers those situations where a gun control is signing on for the first time, where the gun control is signing on a second or subsequent time, and where a gun control identified in the database has been replaced with a new gun control.

The situation can also exist where a gun control is connected to the communication network 44 without any previous identification or entry of data associated therewith in the database. In that situation, the process at 654 will not find an address switch identity in the database corresponding to the address switch identity contained in the sign-on message; and the process at 678 again validates whether the sign-on message contains a node type associated with the gun control. If the node type is not a gun control type, a gateway system error is set at 660. If the node type is a gun control type, the process at 680 allocates space within the database so that a new record associated with the new gun control can be entered. At 664, the "NEURON CHIP" processor identification code in the sign-on message is loaded into the database with the rotary switch identification; at 666, the node network address is written into the database; and the process at 668 sets the initialize task state to establish node addressing. The above process as described with respect to FIG. 11 is effective to sign-on and enter into the system database within the gateway control, gun controls that are connected to the communications network whether or not any previous information has been entered with respect to those gun controls. Consequently, the gateway control upon power up or a reset, automatically scans the network for the existence of gun controls and brings those gun controls on-line in an operative state without any intervention by an operator. In the absence of the above process, one or two persons would be required to manually identify and sign-on each of the gun controls.

Returning to FIG. 10, if as a result of executing the process sign-on message subroutine 610, an establish node addressing task state was set; that state is detected at 612; and a subroutine 614 is executed which is effective to download from the gateway control 56 to the appropriate gun control nodes 38, 40, 42 addressing variables which are required for communication between the "NEURON CHIP" processor 106 associated with the respective gun control and the "NEURON CHIP" processor 96 within the gateway control 56. In addition, those addressing variables are loaded into the database within the gateway control 56 in association with the respective particular gun control. When the addressing mechanisms have been established and successfully downloaded to the gun control, the establish node addressing subroutine sets the initialize task to the on-line state which is detected at 616 and which results in the execution of a set node on-line subroutine 618. The set node on-line subroutine 618 first creates a node on-line command and sends that on-line command across the communication network 44 to the appropriate gun control. If the subroutine detects any error in the communication of the on-line command to the gun control, a system error signal is set. In addition, any communication error resets the gun control installed so that the status indicates that the gun control is not installed. Further, if in the execution of the subroutines of FIG. 10, a system error is generated, a report system error state is created which is detected at 624; and the system error subroutine 626 reports the system error to the operator control and takes whatever other action is appropriate.

Returning to FIG. 4 after the gun control has sent the sign-on message to the gateway control at 304, the gun control then checks at 306 whether it has received the on-line command signal from the gateway control 56. If it has not, the process then determines whether a sign-on timer has timed out at 308. If an on-line command signal is not received within the predetermined period of time determined by the sign-on timer, the process returns to re-execute the initialize subroutine at 302. If the set node on-line subroutine 618 (FIG. 10) is executed in the gateway control 56 to provide the gun control with an on-line command signal prior to the sign-on timer expiring, the gun control reset subroutine of FIG. 4 detects the on-line command at 306, sends an acknowledgement of receipt of the on-line command back to the gateway control and begins an event processor routine 310. Upon receipt of the acknowledgement, the set node on-line subroutine 618 of FIG. 10 starts a heart beat counter for that gun control node and also sets the initialize task state to the download parameters state. The download parameter state is detected at 620, and a download parameters subroutine is executed at 622 which sets the gateway main processing loop of FIG. 9 to run the node download task subroutine 558 thereby effectively ending the node initialize task 554. The node download subroutine running within the gateway CPU 80 sequentially reads the spray parameters from the database associated with the gun control node and the gateway processor 96 transfers the spray parameters serially across the communication network 44 to the respective gun control.

Figure 6:
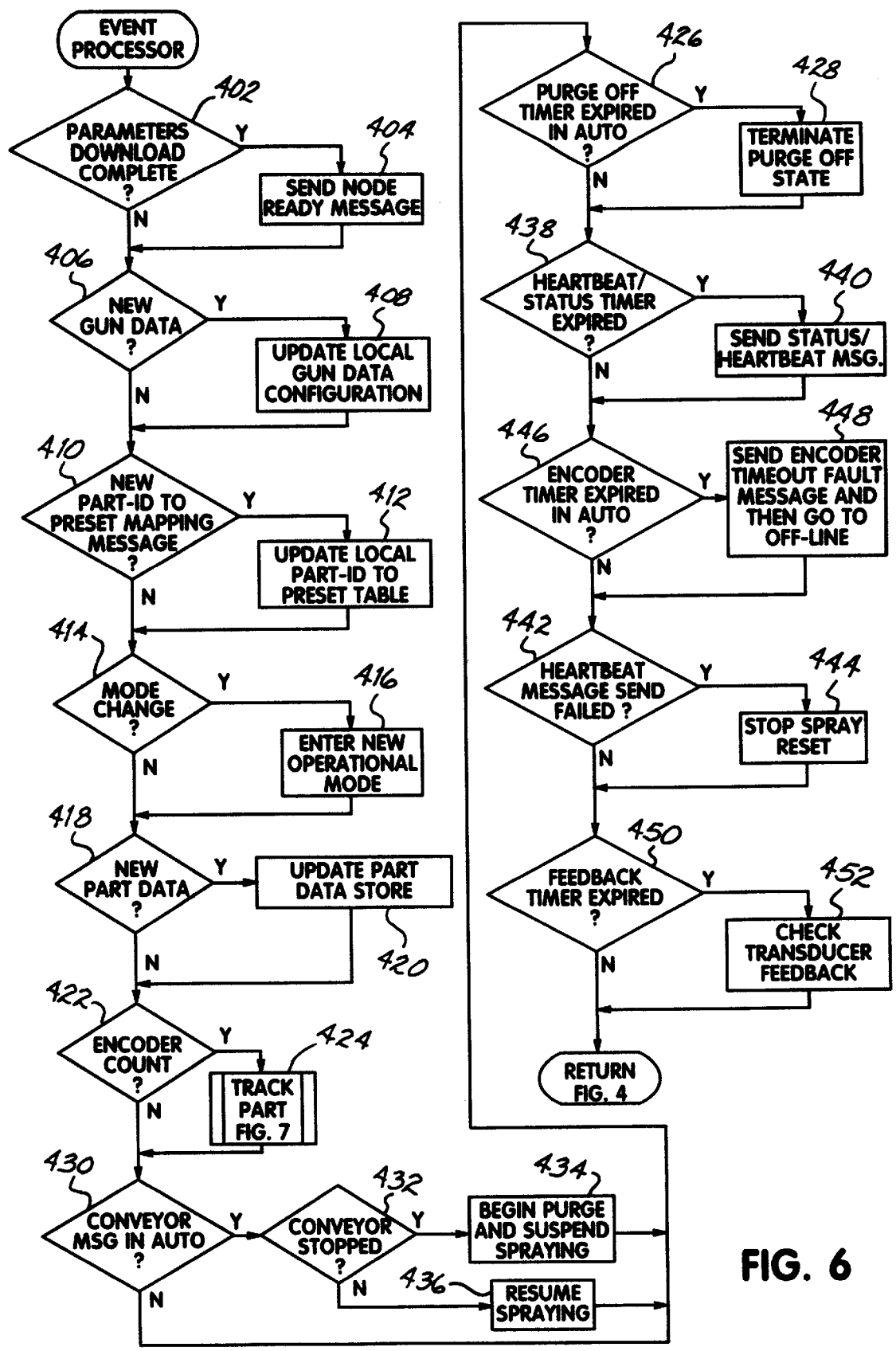
FIG. 6 is a flowchart of the event processor subroutine executed by the main reset routine of FIG. 4.

The gun control processes the receipt of the spray parameters by executing the event processor routine 310 of FIG. 4 which is shown in detail in FIG. 6. Referring to FIG. 6, the event processor first determines whether the download of the spray parameters is complete at 402. If all of the spray parameters have been downloaded and received by the gun control, the gun control sends a node ready message at 404 back to the gateway control 56. If the download of parameters is not complete, the event processor at 406 determines whether the spray parameters represent new gun data. The spray parameters that are required to automatically operate the system, and that are input to the control system using the manual control 36 are divided into two groups of data.

The first group of data is referred to as gun data and is dependent on the particular spray gun and its location within the spray booth. Gun data includes, for example, the pick off point which is the distance from the point at which the photo sensors 54 recognize the part to the spray gun location within the booth; and the current alarm high and low limits which are the maximum and minimum allowable feedback currents for the gun. Also entered is a purge-on parameter which specifies the number of encoder counts representing the duration of a gun purge cycle before a part arrives in front of the gun, and a purge-off parameter specifying the duration in seconds of a gun purge cycle after an end of the part is detected. Other gun data includes the purge flow pressure which is the pressure value to use during the purge-off cycle, and purge atomizing pressure which is the pressure value of the atomizing pressure during a purge-on cycle. If the spray parameters being downloaded represent gun data, the event processor at 408 updates the memory 94 within the gun control with the new gun data.

The gun control has the capability of storing up to 32 different groups or presets of spray parameters. Since the different powder spray guns within the spray booth can be dispensing powder on portions of a part or different parts that have different physical or geometric characteristics, for the most efficient and the highest quality powder coating, the spray parameters for the guns must be adjusted and tailored to the current physical characteristics of the part, or portion of the part, onto which the powder is to be coated. Therefore, a mapping data table for each spray gun is maintained in the nonvolatile memory 94 of the gateway control 56 that associates one of up to 255 different programmable part identification codes to one of up to 32 different presets of spray parameters. It should be noted that the data table defining the relationships of the 255 programmable part identification codes to the 32 presets is treated as a single network variable. This is accomplished by embedding the part identification code in the variable data field in a predefined pattern so the gun control and gateway control can interpret the data field correctly. Similarly, the 32 presets of spray parameters are also treated as a single network variable by embedding the preset identification in the data field and constructing the data field in a predetermined pattern. If, at 410, the parameters downloaded represent a change to the mapping data table, the event processor at 412 updates the mapping data table stored in the memory of the gun control.

Next the event processor determines at 414 whether a mode change has been commanded, and if so, a new mode is entered at 416. The system may be operated in the start-up, the manual, the off-line and the auto modes. If no mode change has been commanded, the event processor at 418 detects whether a new part data, for example, new preset of spray parameters is being downloaded.

The second other group of data, stored in the gateway database within the nonvolatile flash EPROM 94 is referred to as "part data" and is data representing spray parameters which are dependent on the particular part to be sprayed. Part data includes, for example, the preset number which is the address or identifier associated with the particular record in the database containing the presets, or values, of spray parameters associated with that particular part; and the desired KV for the particular spray gun connected to the gun control. For a corona type gun, this field defines a desired output voltage as a percentage of full scale. For a tribo type gun, the field defines the desired minimum feedback current in microamps. Other preset parameters are pattern air pressure, atomizing pressure and flow pressure as a percentage of full scale which on the gun controls 38, 40, 42 is 100 psi. Also preset is the On delay, that is, the number of encoder counts to wait after the part reaches the pick off point and before the purge-on state begins; and the Off delay which specifies a number of encoder counts to continue spraying after the end of part is detected. If new part data, for example, one or more new presets of spray parameters is being downloaded, the event processor at 420 updates the part data store, for example, the preset spray parameter data table in the memory 116 of the gun control. Thereafter, the new preset parameters will be used.

Figure 12:
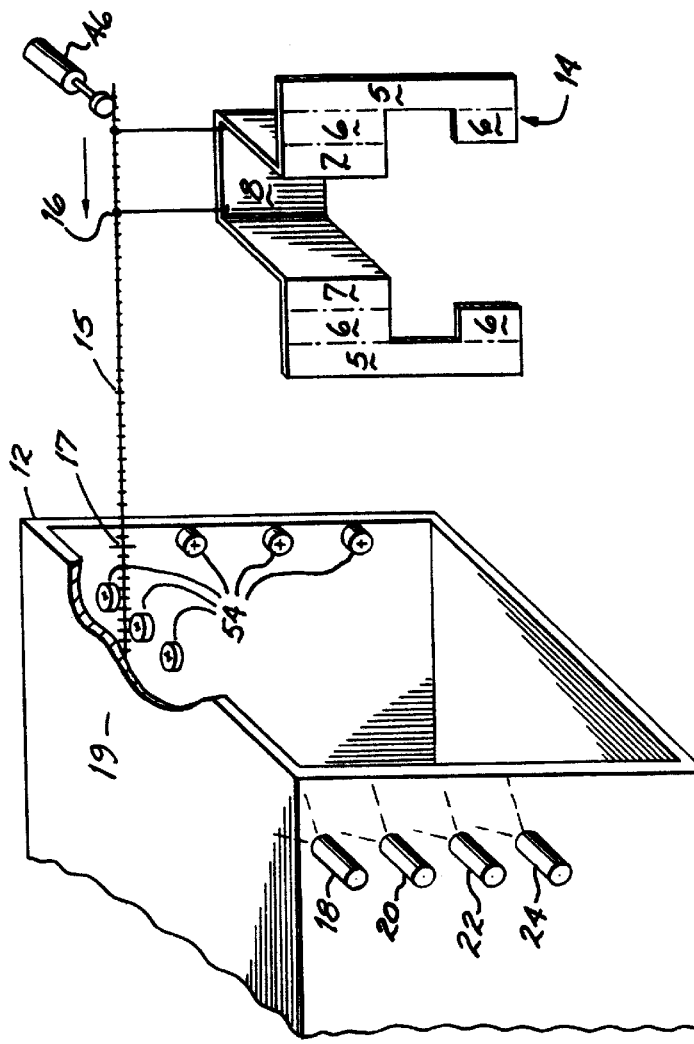
FIG. 12 is a schematic illustration of the relationship of portions of a part having different physical characteristics to components within the powder coating system.

To better understand the operation of the automatic mode of operation, reference is made to FIG. 12 in which powder spray guns 18, 20, 22, and 24 are mounted in the spray booth 12. The part 14 is suspended from a moving conveyor 16, and an encoder 46 is mechanically coupled to the conveyor 16 to track the motion of the part 14 relative to the spray booth. The encoder produces a fixed number of pulses or counts per revolution, so that the rate at which encoder counts are produced is a function of the linear speed of the conveyor 16. The conveyor 16 indicates a number of graduations 15 which are illustrative of an incremental displacements of motion of the conveyor 16 represented by the counts from the encoder 46. A plurality of photosensors 54 are located adjacent the entrance of the spray booth 12 in order to identify the part entering the spray booth. It is readily apparent from an examination of the part 14 that different spray guns will be required to be triggered ON at different times depending on which portion of the part 14 is passing in front of the spray gun. For example, the section 5 of the part 14 will require powder spray guns 18, 20, 22, 24 be spraying. In contrast, section 6 of the part 14 will only require that guns 18, 20, 24 be triggered. Further, section 7 requires only guns 18, 20 and section 8 also requires guns 18, 20; but because of its change in depth from guns 18, 20, the preset spray parameters should be changed in order to better coat section 8. Consequently, the part 14 is divided into four different part identifications 5, 6, 7, 8 which can be recognized by the states of the photosensors 54.

In setting up the mapping data table associating part identifications to different sets of presets in the gun controls for the respective guns 18, 20, each part identification 5, 6, 7 is mapped to the same preset of spray parameters. However, since part identification 8 is set back in depth and is subject to a Faraday caging effect in the internal corners which may result in a poorer quality powder coating, the preset spray parameters for section 8 may be changed to reduce the electrostatic charge setting and increase the penetration of the powder spray cloud into the part.

As previously described, the PPC 50 is connected to the encoder 46 and transmits a part position signal across the network 44 to each of the gun controls 38, 40, 42 which is comprised of the current part identification code being presented by the PLC and the current encoder count. Referring to FIG. 6, the event processor within each gun control detects the encoder count at 422 and executes a track part routine 424 illustrated in FIG. 7. Each gun control tracks the motion of the part 14 through the spray booth 12. That tracking is implemented by a push down stack or queue that has a predetermined number of positions or slots, for example, 2048. As each encoder count is received by the gun control, the part identification associated with the encoder count is loaded in the bottom of the stack or queue. With each successive encoder pulse, its associated part identification is loaded in the bottom of the stack or queue thereby pushing the previous part identification up one slot. Therefore, the queue is a first-in, first-out queue that tracks motion of the part 14 as it is transported by the conveyor 16. The purpose of tracking the conveyor is to determine when the part moves into the proximity of the spray gun as determined by the pick off point. Referring to FIG. 12, from the point 17 where the beginning of the part 14 is detected, the part section 5 will move 12 conveyor counts into the spray booth to the pick off point 19 before it is in the proximity of the guns 18, 20, 22, 24 at which point, those spray guns are activated.

Figure 7:
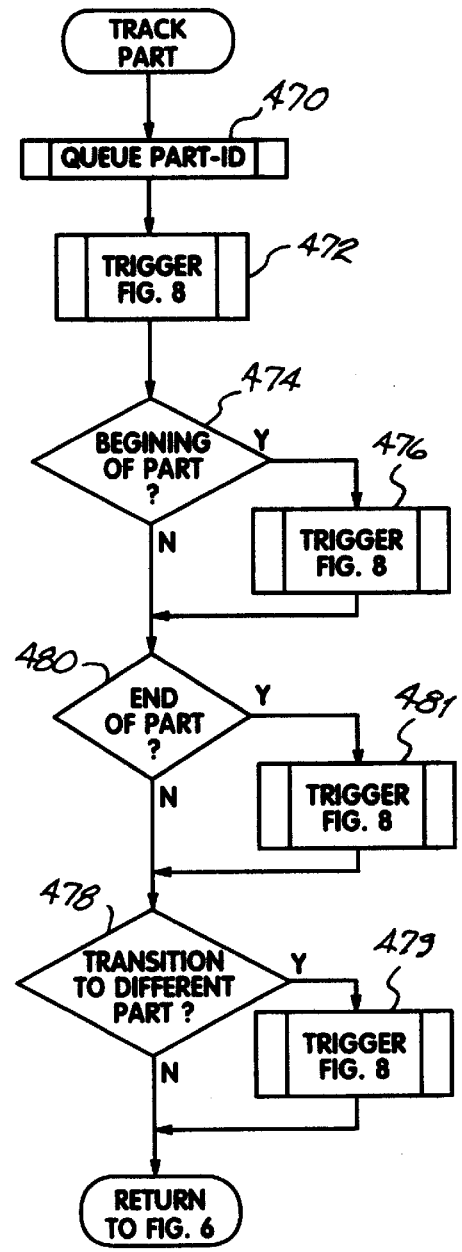
FIG. 7 is a flowchart of a track part subroutine executed by the event processor subroutine of FIG. 6.

Referring to FIG. 7 which illustrates the details of the track part subroutine, the first step of that process is to enter the part identification in the queue at 470. As described above, generally, the part identification will be loaded into the lowermost slot of the queue. However, situations may arise where the encoder count received by the gun control is not incrementally sequential with the prior count. For example, with a potential of 50 gun controls connected to the communications network 44, a send and acknowledge communications protocol could represent excessive traffic on the network 44. Therefore, to reduce network traffic, the receipt of encoder counts by the gun controls is not acknowledged to the gateway control. Consequently, if there is a poor connection in the system or the encoder count message is overridden by a higher priority message, those occurrences will not be detected as part of the communication protocol between the gateway control 56 and the gun controls 38, 40, 42. Therefore, as part of the queue part identification subroutine 470, to detect missing encoder counts, the gun control compares the current encoder count with the previous encoder count. If the comparison indicates that one or more encoder counts are lost, the queue part identification subroutine 470 will increment the queue a number of slots to compensate for the missing encoder counts. If the comparison indicates that the conveyor has moved in a reverse direction a significant magnitude, the queue part identification step 470 will move the part identification in the opposite direction in the queue to simulate a reversal of motion of the part within the spray booth. Further, if the queue part identification subroutine 470 detects a high number of missing encoder counts, an error message is generated. After the part identification has been appropriately entered in the queue, a trigger subroutine 472 is executed. The trigger subroutine is executed several times throughout the track part subroutine and will be subsequently described.

Figure 8:
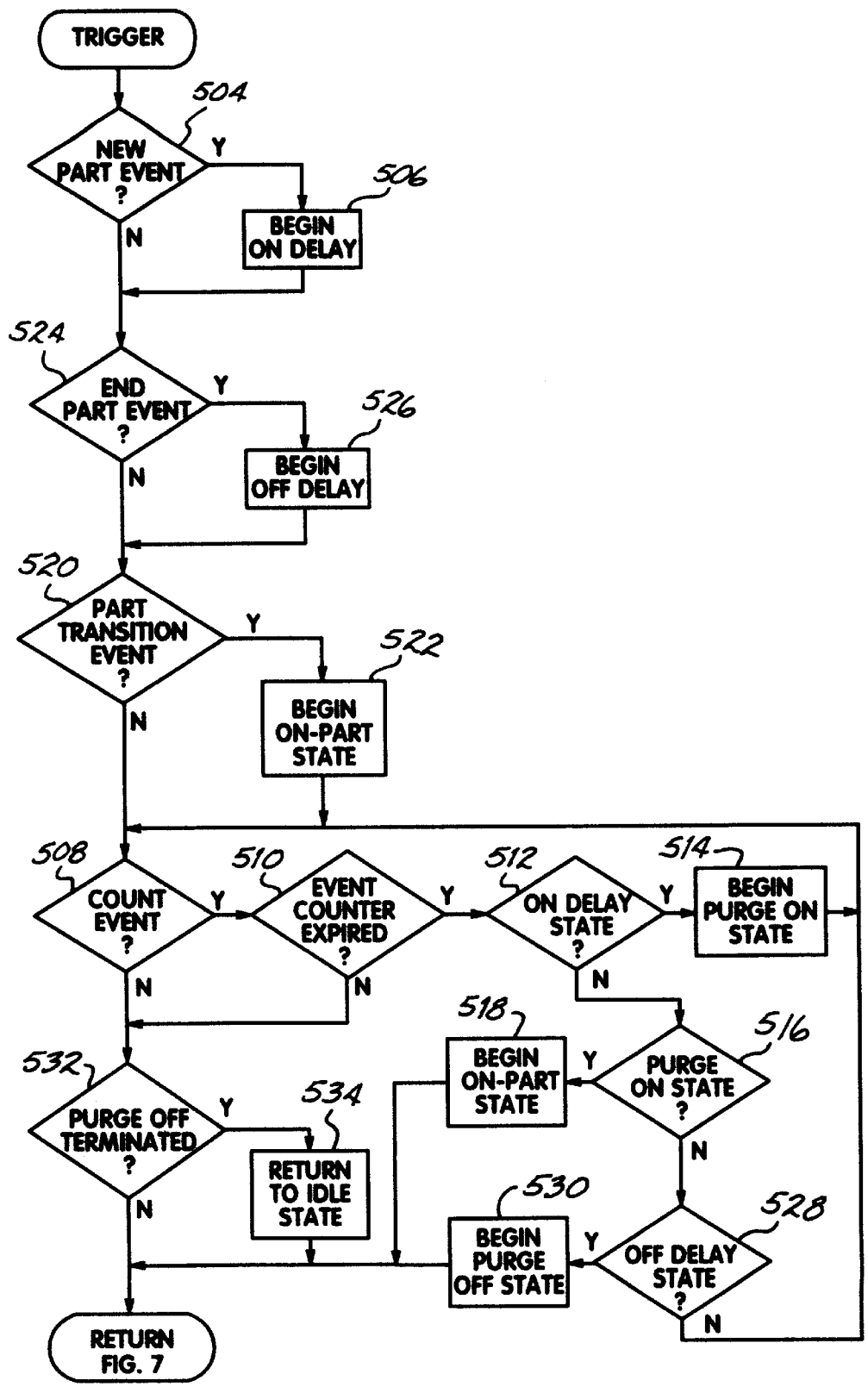
FIG. 8 is a flowchart of a trigger subroutine executed by the track part subroutine of FIG. 7.

Referring to FIG. 12, the pick off point is programmed as part of the gun data associated with the gun and is defined as the distance in terms of incremental displacements represented by each encoder count between the location of a spray gun, for example, gun 18, and the location of the photodetectors 54. Consequently, in the current example, gun 18 is 12 encoder counts from the photodetectors 54; and therefore, the pick off point has a value of 12. The gun control will then continuously monitor the 12th slot in the queue to detect a part identification. Assuming there are no missing encoder counts, after 12 encoder counts, the part identification 5 is entered in the 12th slot of the queue; and the track part subroutine at 474 detects that the 12th slot has changed from a zero to the part identification 5, that is, the beginning of portion 5 of the process then executes the trigger subroutine 476 which is illustrated in FIG. 8.

Generally, starting from an idle state, the cycle of operation of a powder spray gun will sequence through one or more of the following sequential events: a On delay state, a purge ON state, and ON-part state, an Off delay state, a purge OFF state, and a return to the idle state. In any particular cycle, not all of those states must be used; and the cycle changes to accommodate part transitions Further, additional timing periods may be associated with the beginning or ending of any one of those states. Referring to FIG. 8, after the beginning of the part is detected at 474 in FIG. 7, a new part event is detected at 504 which initiates the beginning of an On delay state 506. The amount of On delay is measured in terms of a programmed number of encoder counts; and therefore, the On delay state is a count event as detected at 508. The encoder counts are counted from the beginning of the On delay state; and the process at 510 determines when that counter expires. In the present case, the part identification 5 would have a zero count On delay state; and therefore, the process at 512 would move to 514 to begin a purge ON state and reset the On delay state. During the purge ON state, which preferably is used with a tribo gun, a cleaning, or purging fluid, for example, the pressurized atomizing air, is pumped through the spray gun itself to clean it of foreign materials. The duration of the purge ON state is defined and programmed in terms of encoder counts. However, with part identification 5, the purge ON state is zero; and the process passes through steps 508, 510, 512. At 516, the process moves to the ON part state at 518 while resetting the purge ON state and then returns to FIG. 7.

To summarize, referring to FIG. 12, after the forward edge of the portion 5 of the part 14 moves 12 encoder counts past the detectors 54 to the pick-off point in front of the spray guns 18, 20, 22, 24 the ON-part state is initiated which causes the gun controls to read the preset spray parameters that are associated with part identification 5; and the gun controls for guns 18, 20, 22, 24 begin spraying powder to coat the part section 5 of the part 14. That powder coating process continues for two more encoder counts at which point the part identification 6 enters the 12th slot of the queue in the gun controls associated with guns 18 and 20. At that point, the track part subroutines running in those gun controls detects at 478 a new part identification number in slot 12 of the queue. Therefore, the gun controls associated with guns 18, 20 again execute at 479 the trigger subroutine of FIG. 8. The new part identification number signifies a part transition event at 520, and the ON-part state is initiated at 522 which causes those guns to initiate a powder spraying process in accordance with a set of spray parameters associated with part identification 6. In the example of FIG. 12 the preset parameters for guns 18, 20 for part identification 6 may be the same as those for part identification 5.

In contrast to the operation of gun controls associated with guns 18, 20, the gun control associated with gun 22 detects at 480 of the track part subroutine (FIG. 7) that the 12th slot in its queue went to zero at the same time that the other gun controls detected the part identification 6. The process running in the gun control of gun 22 then at 481 again executes the trigger subroutine of FIG. 8. The trigger subroutine at 524 detects the end of part event; and the gun control associated with gun 22 begins the Off delay state at 526. The Off delay state is also an encoder count dependent event; and if it is zero or after the event counter has expired, the subroutine moves through process steps 508, 510, 512, 516 and 528 to begin the purge OFF state at 530. The process then returns to FIG. 7 which in turn returns to the event processor of FIG. 6. During the purge OFF state, a cleaning or purging fluid, for example, with a corona gun, the pressurized atomizing air, may be pumped through the dispensing hose 30 and the spray gun to purge unsprayed powder from the hose and gun. With a tribo gun, purging may be accomplished by, for example, shutting off the powder and pumping the powder flow air through the dispensing hose and the gun and the atomizing air through the gun. When the event processor at 426 detects that the purge OFF timer has expired in the auto mode, the process at 428 terminates the purge OFF state. If an encoder count is detected at 422 in the next iteration through the event processor, the track part subroutine 424 again executes the trigger subroutine 472 of FIG. 7. As shown in FIG. 8, the trigger subroutine moves through steps 504, 524, 520, 508 to 532 at which point the termination of the purge OFF state is detected; and the gun is returned to its idle state at 534.

Referring to FIG. 6 the event processor subroutine provides several other functions independent of the direct control of the powder coating process. For example, if at 430 the event processor detects a conveyor message from the gateway control, and if the gun control at 432 determines that the message indicates that the conveyor has stopped, the subroutine at 434 will initiate a purge OFF state and suspend spraying. If during a subsequent iteration through the event processor subroutine, the process detects a subsequent conveyor message at 430 and determines at 432 that the conveyor is no longer stopped, the event processor at 436 will reinitiate the state that was terminated at 434 and resume processing the part.

As is typical with communications systems, the control system contains numerous timers that require a periodic communication event. For example, as part of the on-line task in the initialization of the gateway control, a heart beat timer is started and requires that each gun control send a heart beat message to the gateway control within a predetermined period of time, for example, 20 seconds. Therefore, each gun control has a heart beat timer that times a predetermined period of time, for example, 10 seconds and the event processor at 438 detects the expiration of the 10 second heart beat timer and sends a heart beat message at 440 to the gateway control. Upon receipt of the heart beat message, the gateway control resets its 20 second heart beat timer and acknowledges receipt of the heart beat message to the gun control. If the acknowledgement is not received, the event processor at 442 detects that the sending of the heart beat message to the gateway control failed and at 444, terminates the operation of the spray gun and initiates the gun control reset routine of FIG. 4. In addition to the above described heart beat, the event processor contains a status timer, for example, a one second timer that after every one second sends a status message to the gateway control which includes the current operational preset values of the gun control, for example, the gun current, various pressures, active preset number, gun mode, present trigger state, etc.

The expiration of the status timer is detected at 438 within the event processor subroutine, and that status message is forwarded at 440 to the gateway control.

The communication link between the PPC 50 and each of the gun controls 38, 40, 42 is also continuously checked. The PPC 50 is required to continuously send an encoder count to each of the gun controls independent of whether the conveyor is moving. Therefore, even if the conveyor is stopped, the PPC will send the most recent part identification and encoder count to each of the gun controls. Each of the gun controls has an encoder time out timer which is reset by the receipt of an encoder count from the PPC 50. However, if the event processor at 446 detects that the encoder timer has expired in the auto mode, the event processor at 448 sends an encoder time out fault message to the gateway control and switches the gun control from the auto mode to the off-line mode.

The gun control also periodically reads the feedback signals from the power amplifier 124 and powder flow and atomizing air transducers 130, 132. The frequency at which the feedback signals is read is determined by a feedback timer running within the gun control, and the event processor at 450 detects when the feedback timer has expired. In response thereto at 452, the event processor causes gun control processor 106 by means of the A/D and scaling circuit 128 to read the current being supplied by the KV generator 126 and produces an error signal in response to the current exceeding the alarm high or low limits. In addition, the gun control processor 106 checks whether the feedback signals for the powder flow pressure, atomizing air pressure and pattern air pressure, if used, are in excess of their upper and lower limits, for example, plus or minus 5 psi of the preset value for those parameters. If any of the limits are exceeded, the gun control processor 106 provides the appropriate error signals to the gateway control 56.

In summary, in view of the foregoing detailed description it can now be appreciated that systems made in accordance with the present invention will include a distributed control architecture, as is preferably provided by a "NEURON CHIP" type processor with each gun control and associated powder pump, wherein each processor is connected to a communications network. In addition, some shared control element is preferable. In this way, each spray gun is individually and optimally controlled in response to part identification and position data with minimal operator involvement. This provides a flexible and comprehensive control system with less wiring.

While the invention has been set forth by a description of the embodiment in considerable detail, it is not intended to restrict or in any way limit the claims to such detail. Additional advantages and modifications will readily appear to those who are skilled in the art.

For example, the configuration of the system control 34 that includes the operator control 36, part position control 50, PLC 52 and gateway control 56 is a matter of design choice. The functions provided by those various controls may be implemented with different configurations of controls depending on the nature of the communications network 44, the speeds of the processors within the various controls and other technical considerations.

Further, the function of the photosensors 54 for detecting a physical characteristic of the part may be implemented using other types of proximity sensors or an imaging device. In addition, the function of the encoder 46 of providing increments of displacement of the moving part may be implemented using other position transducers. Further, many of the functions determined by the measurement of encoder counts may also be determined by timers and vice versa. It will be appreciated that other components within the various controls, for example, the flash EPROM 94 of the gateway control 56 to provide a nonvolatile memory may be implemented with other known nonvolatile storage devices.

In addition, while electrical communication through wires is presently contemplated, "electrical communication" could also be through fiber optic cables, infrared light, radio frequency, or other means by which information can be transmitted between electrical devices.

It is understood therefore that the invention is not intended to be limited to the specific details shown and described and that departures may be made from such details without departing from the spirit and scope of the invention.

What is claimed is:

1. A powder coating system for applying a powder coating to a part comprising:
    a plurality of powder spray guns disposed with respect to the part;
    at least one powder source supplying powder to said plurality of spray guns through a plurality of hoses connected between the at least one powder source and the spray guns;
    a plurality of flow regulators, each flow regulator varying the flow of powder through one of the hoses;
    a plurality of controls, each of the controls including a processor connected to a memory storing at least one set of spray parameters, each of the flow regulators being connected to one of the controls and each of the controls selecting the one set of spray parameters to vary the operation of the associated regulator and control the flow of powder through one of the hoses; and
    a communications network in electrical communication with the plurality of controls for providing data to the plurality of controls.

2. The apparatus of claim 1 wherein the communications network is a local operating network.

3. The apparatus of claim 2 wherein the communications network further comprises a node associated with each of the plurality of controls and in electrical communications with the local operating network.

4. The apparatus of claim 2 further comprising motion controls associated with at least one of the spray guns for controlling motion of the one of the spray guns and wherein the local operating network provides electrical communications between the plurality of controls and the motion controls.

5. The apparatus of claim 2 further comprising a sensor for detecting the presence of the part and wherein the local operating network provides electrical communications between the sensor and the plurality of controls.

6. The apparatus of claim 2 further comprising a computer in electrical communications with the local operating network for providing, and the computer providing and/or receiving data relating to the spray parameters.

7. The apparatus of claim 6 wherein the computer is an operator control.

8. The apparatus of claim 6 wherein the computer is an external computer.

9. A powder coating system for applying a powder coating to a part comprising:
    a powder source containing a supply of the powder;
    a plurality of flow regulators, one of the flow regulators being connected to the powder source;
    a plurality of powder spray guns, one of the powder spray guns receiving powder from the powder source;
    a plurality of controls, each of the controls including a processor connected to a memory storing at least one set of spray parameters, each of the controls being connected to one of the flow regulators and one of the powder spray guns and one of the controls causing the one of the flow regulators to vary the flow of powder to a respective spray gun as a function of the one set of spray parameters; and
    a communications network in electrical communication with the plurality of controls.

10. The apparatus of claim 9 wherein the communications network further comprises a node in electrical communications with each of the plurality of controls and a local operating network.

* * * * *